US011053567B2

(12) United States Patent
Lu et al.

(10) Patent No.: US 11,053,567 B2
(45) Date of Patent: Jul. 6, 2021

(54) METHOD FOR THE FABRICATION OF ARCHITECTED 3D HIGH ENTROPY ALLOY STRUCTURES

(71) Applicant: City University of Hong Kong, Kowloon (HK)

(72) Inventors: Yang Lu, New Territories (HK); James Utama Surjadi, Kowloon (HK)

(73) Assignee: City University of Hong Kong, Kowloon (HK)

(*) Notice: Subject to any disclaimer, the term of this patent is extended or adjusted under 35 U.S.C. 154(b) by 216 days.

(21) Appl. No.: 15/984,673

(22) Filed: May 21, 2018

(65) Prior Publication Data

US 2019/0352743 A1   Nov. 21, 2019

(51) Int. Cl.
*C22C 1/04* (2006.01)
*B22F 1/00* (2006.01)
(Continued)

(52) U.S. Cl.
CPC .............. *C22C 1/04* (2013.01); *B22F 1/0059* (2013.01); *B22F 3/105* (2013.01); *B22F 3/1021* (2013.01);
(Continued)

(58) Field of Classification Search
CPC ............ B22F 1/0059; B22F 2003/1057; B22F 2003/1058; B22F 2003/248; B22F 3/008;
(Continued)

(56) References Cited

U.S. PATENT DOCUMENTS 8,075,661 B2   12/2011   Chen et al.
2017/0209954 A1   7/2017   Kato et al.

FOREIGN PATENT DOCUMENTS

WO   WO-2016013498 A1 *   1/2016   ......... C22C 33/0257

OTHER PUBLICATIONS

Effect of substrate temperature on the interface bond between supportand substrate during selective laser melting of Al—Ni—Y—Co—La metallicglass X.P. Li, M. Roberts, Y.J. Liu, C.W. Kang, H. Huang,T.B. Sercomb Materials and Design 65 (2015) pp. 1-6 (Year: 2015).*

(Continued)

*Primary Examiner* — Jenny R Wu
(74) *Attorney, Agent, or Firm* — Renner Kenner Greive Bobak Taylor & Weber

(57) ABSTRACT

A method for the fabrication of architected 3D high entropy alloy structures includes deriving a 3D architecture based on at least one physical property of a high entropy alloy; preparing a fabrication powder including a mixture of two or more metallic powders of nearly equal quantities; arranging a first layer of the fabrication powder on a platform proximate to an energy source; directing energy provided by the energy source to one or more portions of the fabrication powder until portions thereof are sufficiently heated to be melted into one or more solid portions; translating the platform relative to the energy source such that the platform is proximate to the energy source and arranging a second layer of the fabrication powder contiguous to the first layer of fabrication powder on the platform; whereby these steps (Continued)

of arranging, directing, and translating are repeated to form a structure with the derived 3D architecture.

15 Claims, 8 Drawing Sheets

(51) Int. Cl.
    *B22F 3/10*     (2006.01)
    *B22F 3/105*     (2006.01)
    *B22F 3/24*     (2006.01)
    *C22C 30/00*     (2006.01)
    *C22C 47/06*     (2006.01)
    *C22C 47/14*     (2006.01)
    *B22F 10/30*     (2021.01)

(52) U.S. Cl.
CPC ............... *B22F 3/24* (2013.01); *C22C 30/00* (2013.01); *C22C 47/06* (2013.01); *C22C 47/14* (2013.01); *B22F 10/30* (2021.01); *B22F 2003/248* (2013.01)

(58) Field of Classification Search
CPC ...... B22F 3/1021; B22F 3/1035; B22F 3/105; B22F 3/1055; B22F 3/1115; B22F 3/24; B33Y 10/00; B33Y 80/00; C22C 1/04; C22C 30/00; C22C 47/06; C22C 47/14
See application file for complete search history.

(56) References Cited

OTHER PUBLICATIONS

Gao, L. et al. "High-Entropy Alloy (HEA)-coated Nanolattice Structures and Their Mechanical Properties". Adv. Eng. Mater. 1700625, 1700625 (2017).
Wendy Gu, X. et al. "Ultra-strong architected Cu meso-lattices". Extrem. Mech. Lett. 2, 7-14 (2015).
Warmuth, F. et al. "Fabrication and characterization of a fully auxetic 3D lattice structure via selective electron beam melting". Smart Mater. Struct. 26, (2017).
Fleck, N. A. et al. "Micro-architectured materials: past, present and future". Proc. R. Soc. A Math. Phys. Eng. Sci. 466, 2495-2516 (2010).
Valdevit, L. et al. "Protocols for the optimal design of multi-functional cellular structures: From hypersonics to micro-architected materials". J. Am. Ceram. Soc. 94, 15-34 (2011).
Yeh, J. W. et al. "Nanostructured high-entropy alloys with multiple principal elements: Novel alloy design concepts and outcomes", Adv. Eng. Mater. 6, 299-303+274 (2004).
Cantor, B., et al. "Microstructural development in equiatomic multicomponent alloys. Mater". Sci. Eng. A 375-377, 213-218 (2004).
Pickering, E. J. et al. "High-entropy alloys: a critical assessment of their founding principles and future prospects". Int. Mater. Rev. 61, 183-202 (2016).
Gludovatz, B. et al. "A fracture-resistant high-entropy alloy for cryogenic applications". Science (80–). 345, 1153-1158 (2014).

* cited by examiner

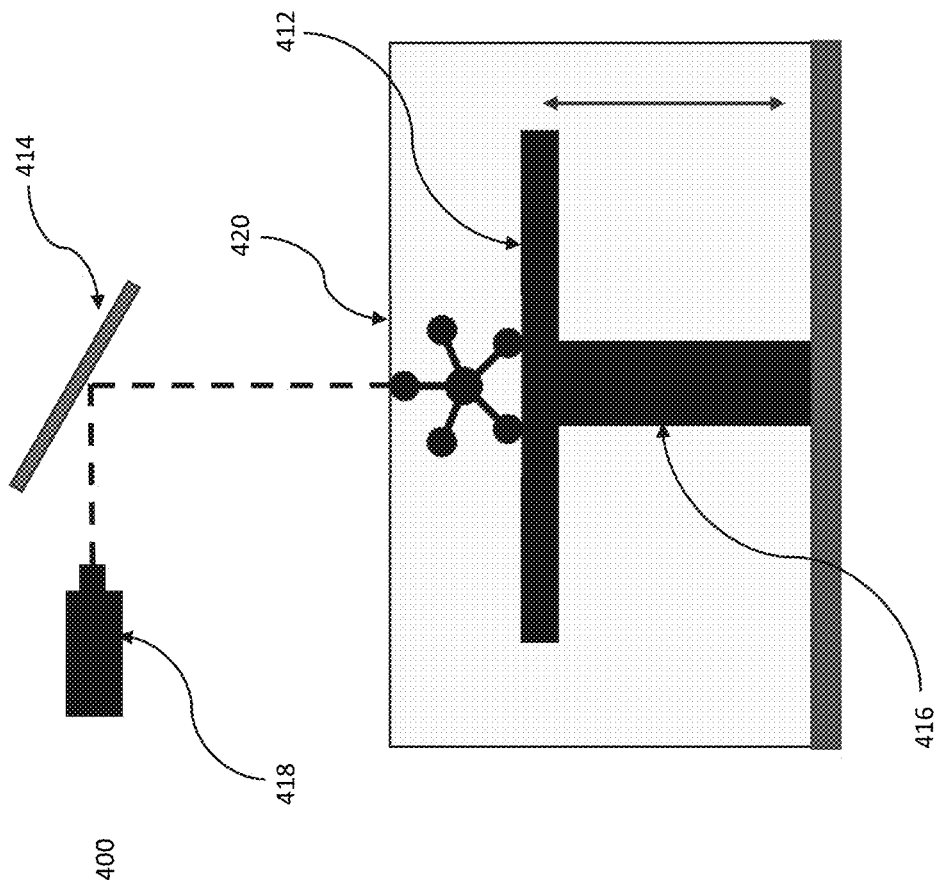
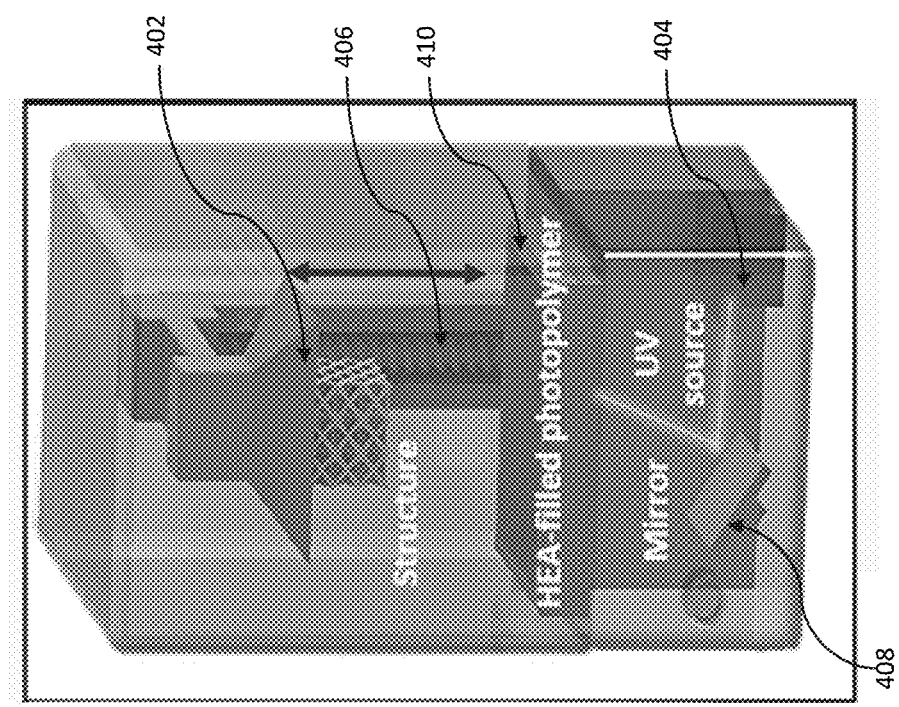
Figure 4b
Figure 4a

METHOD FOR THE FABRICATION OF ARCHITECTED 3D HIGH ENTROPY ALLOY STRUCTURES

TECHNICAL FIELD

The present invention relates to a method of using additive manufacturing techniques to fabricate mechanical 3D architectures consisting of High Entropy Alloys. In one specific embodiment, the invention relates to the use of a number of different additive manufacturing technologies that enable the fabrication of complex and architecturally beneficial structures that supplement the advantageous structural properties of High Entropy Alloys.

BACKGROUND

High Entropy Alloys (HEAs) have been the subject of much research within the last ten to fifteen years. HEAs have been industrially applied as an additive or supplementary coating to conventionally manufactured parts or surfaces to impart the advantageous features of HEAs such as corrosion resistance, hardness and thermal stability. HEAS may be fabricated by die casting by melting each of the alloy components together and casting the molten metal into a mould before machining or tooling the part to achieve the desired form.

Whilst such manufacturing techniques enable the industrial application of HEAs, there are limitations to the complexity and size of the structures that may be fabricated. Further, the current solutions only consider the applications of HEAs as a mere supplementary element and do not consider the applications of HEAs in their own right.

SUMMARY OF THE INVENTION

According to a first aspect of the invention, there is provided a method for the fabrication of architected 3D high entropy alloy structures comprising the steps of: deriving a 3D architecture based on at least one physical property of a high entropy alloy; preparing a fabrication powder that includes a mixture of two or more metallic powders of nearly equal quantities; arranging a first layer of the fabrication powder on a platform proximate to an energy source; directing energy provided by the energy source to one or more portions of the fabrication powder until the one or more fabrication powder portions are sufficiently heated to enable the one or more fabrication powder portions to be melted into one or more solid portions; translating the platform relative to the energy source such that the platform is proximate to the energy source and arranging a second layer of the fabrication powder contiguous to the first layer of fabrication powder on the platform; whereby the steps of arranging a layer of fabrication powder, directing energy to the one or more portions of the fabrication powder, and translating the platform are repeated such that the resulting layers of one or more solid portions are arranged in such a way as to form a structure with the derived 3D architecture.

The platform may be movable relative to a fixed energy source.

The energy source may include a laser or electron beam gun.

The method may further include varying the temperature of a portion of the movable platform to improve the adhesion of a first layer of the one or more solid portions to the portion of the platform.

The method may further include the formation of structural supports to support the fabrication of the architected 3D structure.

The method may further include subjecting the structure to at least one of a stress relieving processes and a heat treatment.

The energy directed at the fabrication powder may be in accordance with a series of instructions translated from a computer assisted drawing file.

According to a second aspect of the invention, there is provided a method for the fabrication of architected 3D high entropy alloy structures comprising the steps of: deriving a 3D architecture based on at least one physical property of a high entropy alloy; preparing a fabrication mixture that includes a mixture of two or more metallic powders of nearly equal quantities, a photosensitive polymer, and a curing agent; arranging a first layer of the fabrication mixture on a platform proximate to an energy source; directing energy provided by the energy source to one or more portions of the fabrication mixture to activate the curing agent to form one or more solid portions; translating the platform relative to the energy source such that the platform is proximate to the energy source and arranging a second layer of the fabrication mixture contiguous to the first layer of fabrication mixture on the platform; whereby the steps of arranging a layer of fabrication mixture, directing energy to the one or more portions of the fabrication mixture, and translating the platform are repeated such that the resulting layers of one or more solid portions are arranged in such a way as to form a structure and removing the photosensitive polymer from the structure by means of a debinding process so that the structure is entirely comprised of a mixture of metals and includes the derived 3D architecture.

The method may further comprise the step of compressing the structure entirely comprised of a mixture of metals by the application of at least one of heat and pressure up to the point of liquidation.

The energy source may include an ultra violet light source, or a fibre laser.

The platform may be moveable relative to the energy source.

The platform may be arranged to be movable within a fixed container containing the fabrication mixture.

The platform may be arranged to be movable outside a fixed container containing the fabrication mixture.

The method may further include varying the temperature of a portion of the platform to improve the adhesion of the first layer of the fabrication mixture to the platform.

The method may further include the formation of structural supports to support the fabrication of the architected 3D structure.

The method may further include subjecting the structure to at least one of a stress relieving processes and a heat treatment.

The energy directed at the fabrication mixture may be in accordance with a series of instructions translated from a computer assisted drawings file.

According to a third aspect of the invention, there is provided a method for the fabrication of architected 3D high entropy alloy structures comprising the steps of: deriving a 3D architecture based on at least one physical property of a high entropy alloy; preparing a fabrication filament that includes a mixture of two or more powdered metals of nearly equal quantities and a thermosoftening polymer; feeding the fabrication filament through a thermal printing head moveable relative to a fabrication base; sequentially depositing one or more layers of heated fabrication filament by means of the thermal printing head to form a layered structure; removing the thermosoftening polymer from the structure by means of a debinding process so that the structure is entirely comprised of a mixture of metals and includes the derived 3D architecture.

The method may further comprise the step of compressing the structure entirely comprised of a mixture of metals by the application of at least one of heat and pressure up to the point of liquidation.

The method may further include the formation of structural supports to support the fabrication of the architected 3D structure.

The method may further include subjecting the structure to at least one of a stress relieving processes and a heat treatment.

The deposition of the fabrication filament in the one or more layers may be in accordance with a series of instructions translated from a computer assisted drawing file.

BRIEF DESCRPTION OF THE DRAWINGS

Further features of the present invention are more fully described in the following description of several non-limiting embodiments thereof. This description is included solely for the purpose of exemplifying the present invention. It should not be understood as a restriction on the broad summary, disclosure or description of the invention as set out above. The description will be made with reference to the accompanying drawings in which:

FIGS. 4a and 4b show schematic views of apparatuses according to different embodiments of present invention.

DETAILED DESCRIPTION OF THE PREFERRED EMBODIMENTS

Figure 1:
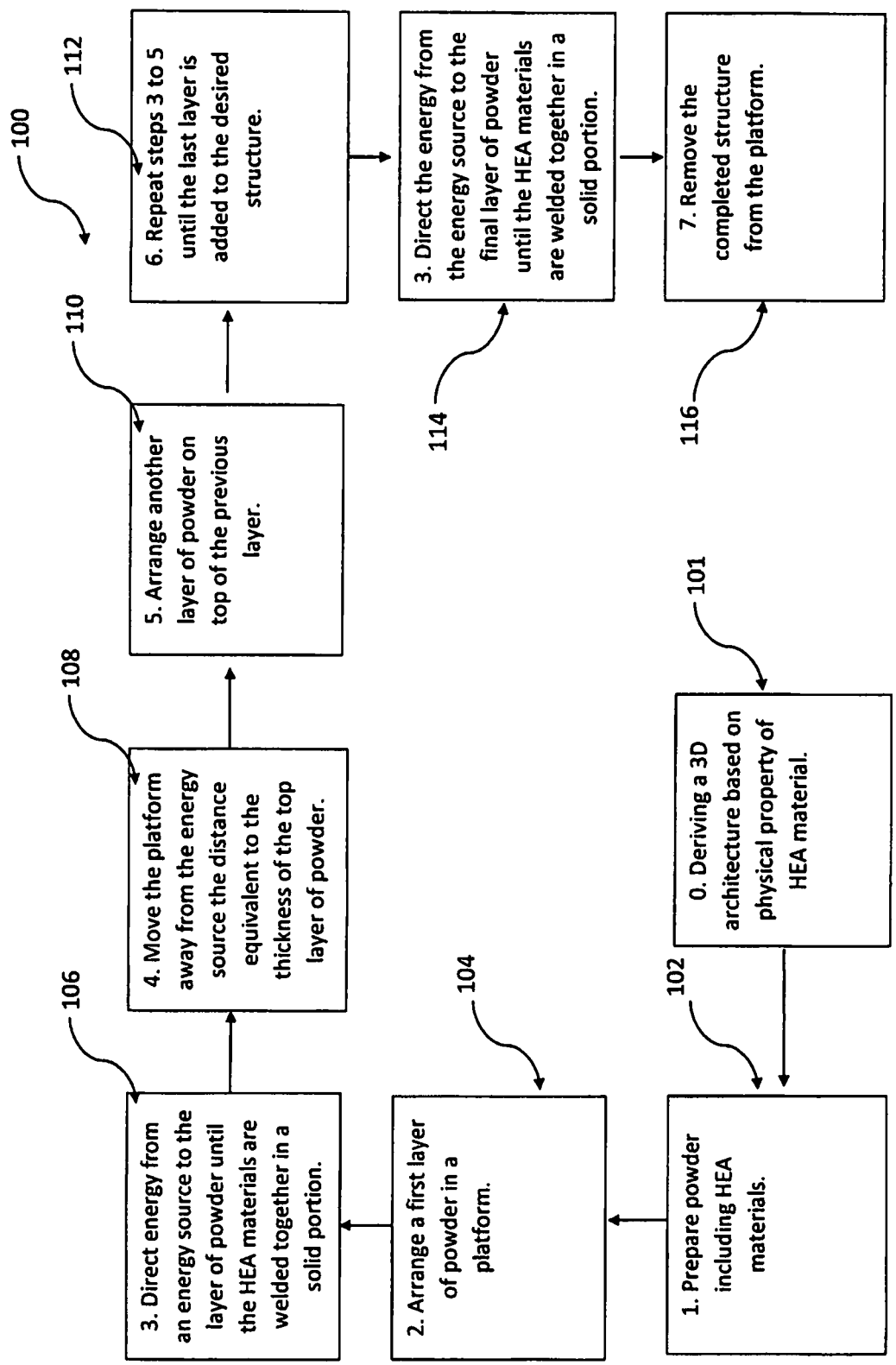
FIG. 1 shows a process diagram of an embodiment of present invention.

Without wishing to be bound by theory, the inventors, through their own research via trials and experimentation, have discovered that it would be useful to provide a solution that incorporates the benefit of architecture into the design and fabrication of architected 3D HEAs. For instance, through a combined effect, it is possible to produce HEAs that are both lighter and stronger than its bulk counterpart produced using traditional methods. Furthermore, the controlled synthesis provided by 3D printing could potentially produce HEA structures that preferably avoids or ameliorates any one or more of the disadvantages present in the current approaches to fabricating HEA structures.

Broadly, one aspect of the invention is directed to a method for fabricating High Entropy Alloy (HEA) structures using additive manufacturing techniques. The method includes the following steps. Firstly, a 3D architecture is derived based on at least one physical property of a high entropy alloy. For instance, a 3D architecture that is suitable for intended application and/or complements one or more unique properties of the HEA may be designed by a user. Secondly, a fabrication powder which includes a mixture of metallic powders of nearly equal quantities is prepared. A first layer of the fabrication powder is arranged on a platform proximate to an energy source. Energy from the energy source is directed at the fabrication powder. The energy is applied until the one or more fabrication powder portions are sufficiently heated such that the one or more fabrication powder portions melts to form one or more solid portions. The platform is translated relative to the energy source, such that the platform is proximate to the energy source. A second layer of the fabrication powder is arranged contiguous to the first layer of fabrication powder on the platform. The arrangement of contiguous fabrication powder, direction of energy to the one or more portions of the fabrication powder and translation of the platform is repeated such that the resulting layers of one or more solid portions are arranged in such a way to form a structure.

Broadly, another aspect of the invention is directed to a method for fabricating HEA structures using additive manufacturing techniques. The method includes the following steps. Firstly, deriving a 3D architecture based on at least one physical property of a high entropy alloy. Secondly, preparing a fabrication mixture that includes a mixture of two or more, preferably five metallic powders of nearly equal quantities, a photosensitive polymer, and a curing agent. A first layer of the fabrication mixture is arranged on a platform proximate to an energy source. Energy from the energy source is directed to one or more portions of the fabrication mixture to activate the curing agent to form one or more solid portions. The platform is translated relative to the energy source such that the platform is proximate to the energy source and a second layer of the fabrication mixture is arranged on the platform contiguous to the first layer of fabrication mixture. The arrangement of contiguous fabrication mixture, directing energy to the one or more portions of the fabrication mixture, and translating the platform are repeated such that the resulting layers of one or more solid portions are arranged in such a way to form a structure. The photosensitive polymer is removed from the structure by means of a debinding process so that the structure is entirely comprised of a mixture of metals.

Broadly, in another aspect of the invention is directed to a method for fabricating HEA structures using additive manufacturing techniques. The method includes the following steps. Firstly, a 3D architecture based on at least one physical property of a high entropy alloy is derived. Secondly, a fabrication filament that includes mixture of metallic powders of nearly equal quantities and a thermosoftening polymer is prepared. The fabrication filament is fed through a thermal printing head which is moveable relative to a fixed fabrication base. The thermal printing sequentially deposits one or more layers of heated fabrication filament to form a layered structure. Once the layered structure has been formed, the thermosoftening polymer is removed by means of subjecting the one or more structures to a debinding process such that the structure is entirely comprised of a mixture of metals.

In the context of the broader inventive concept and the embodiments described herein, a High Entropy Alloy (HEA) is an alloy composition that includes upwards of two or more, preferably five different metals of nearly equal ratios. Depending on the constituent metals, a HEA can include a wide range of advantageous mechanical properties, such as high toughness, yield strengths and stability through a wide range of temperatures. There are many different possible combinations of metals that may be used to form a HEA structure and it will be understood that the inventive concept and embodiments described and defined herein may be applied to any suitable HEA.

Specific embodiments will now be described in more detail with reference to the drawings. Referring to FIG. 1, a process diagram is shown outlining the method of the present invention 100.

In more detail, the method may include the melting and solidification HEA powders into a structure by heating the HEA powder with an energy source. Technologies used to achieve this may include Selective Laser Melting (SLM) or Electron Beam Melting (EBM), and Direct Metal Laser Sintering (DMLS).

For SLM, EBM and DMLS technologies, an embodiment first includes deriving of a 3D architecture based on the physical property of a high entropy alloy 101, followed by the preparation of the HEA powder 102. To be suitable for SLM, EBM and DMLS technologies, the powder is produced to have a homogenous distribution of the metals that make up the alloy at a suitable grain size. For example, grain size for SLM, EBM and DMLS technologies may be between 5 and 80 microns.

The preparation of the HEA powder may be achieved in a number of ways, such as but not limited to, centrifugal disintegration or atomization of a melted bulk HEA. In an embodiment, atomisation is used, which is a process that includes forcing a stream of molten HEA material through an orifice at moderate pressures. Gas or water may be introduced to the stream of molten HEA at the point of leaving the orifice which creates a turbulence which changes the molten stream into a powder of fine metallic particles or grains. The molten HEA may be obtained by melting a portion of pre-alloyed HEA in an arc furnace. There are limitations on the size of the orifice that may be used for atomisation, which may lead to variation in grain sizes of the powdered HEA. Accordingly, further mechanical or chemical processing may be required to ensure that the grains are reasonably uniform in size and to remove oxidation contamination.

In an embodiment, to create a structure from a plurality of layers, the HEA powder is arranged in a first layer on a platform 104. Once the first layer has been distributed on the platform, energy from an energy source is directed onto the layer of HEA powder 106. In embodiments using SLM and DMLS technology, the energy source is a high-powered laser. The laser power, spot size, travel speed, and layer thicknesses are important parameters that may be adjusted for this method and would vary for each kind of material with different grain sizes. The thermal properties of the HEA could be identified by using Differential Scanning calorimetry (DSC), which could aid in determining the laser parameters. An example configuration could be a 100 W laser with spot size of 100 μm, a travel speed of 900 mm/s, and a layer height of 50 μm. Alternatively, in an embodiment using EBM technology, the energy source is an electron beam gun.

The energy source is applied to one or more portions of powder until the powder fuses together into liquid metal as in the case for embodiments using SLM and EBM technologies. Alternatively, embodiments using DMLS technology, the HEA powder is sintered which enables the metal powder to be welded together into a structure without heating the powder to a liquid form.

Once the heated portions of the HEA powder are allowed to cool, the heated portions of the HEA powder solidify to form a first solid layer of a HEA structure. In an embodiment, structural supports may also be added to the HEA structure to provide support during fabrication in cases where the initial or base layers of the structure do not provide sufficient support to top layers. These supports are typically removed during post fabrication processing. Further, stress relieving and heat treatment processes may also be performed on the structure during post fabrication and prior to removal from support structures. In an embodiment, the platform may be heated or cooled to improve the adhesion of the structure to the platform.

Once the first layer has cooled, the moveable platform moves away from the energy source 108 and a second layer of HEA powder is applied 110. The distance that the platform is moved away from the energy source is equivalent to the thickness of the layer of powder applied such that the distance between the energy source and the top layer of powder remains the same regardless how many layers of HEA powder are applied.

The steps of directing energy from the energy source 106, moving the movable platform 108 and applying another layer of HEA powder 110 are repeated 112 until the structure is completed 114. The resulting structure is formed from layering of a plurality of welded or fused HEA layers. This allows for highly complex structures to be fabricated in such a way as to complement or highlight the material properties of the HEA material. The completed structure is then removed from the build platform 116. Any excess HEA powder that was not heated or used may be brushed or otherwise removed from the structure.

Figure 2:
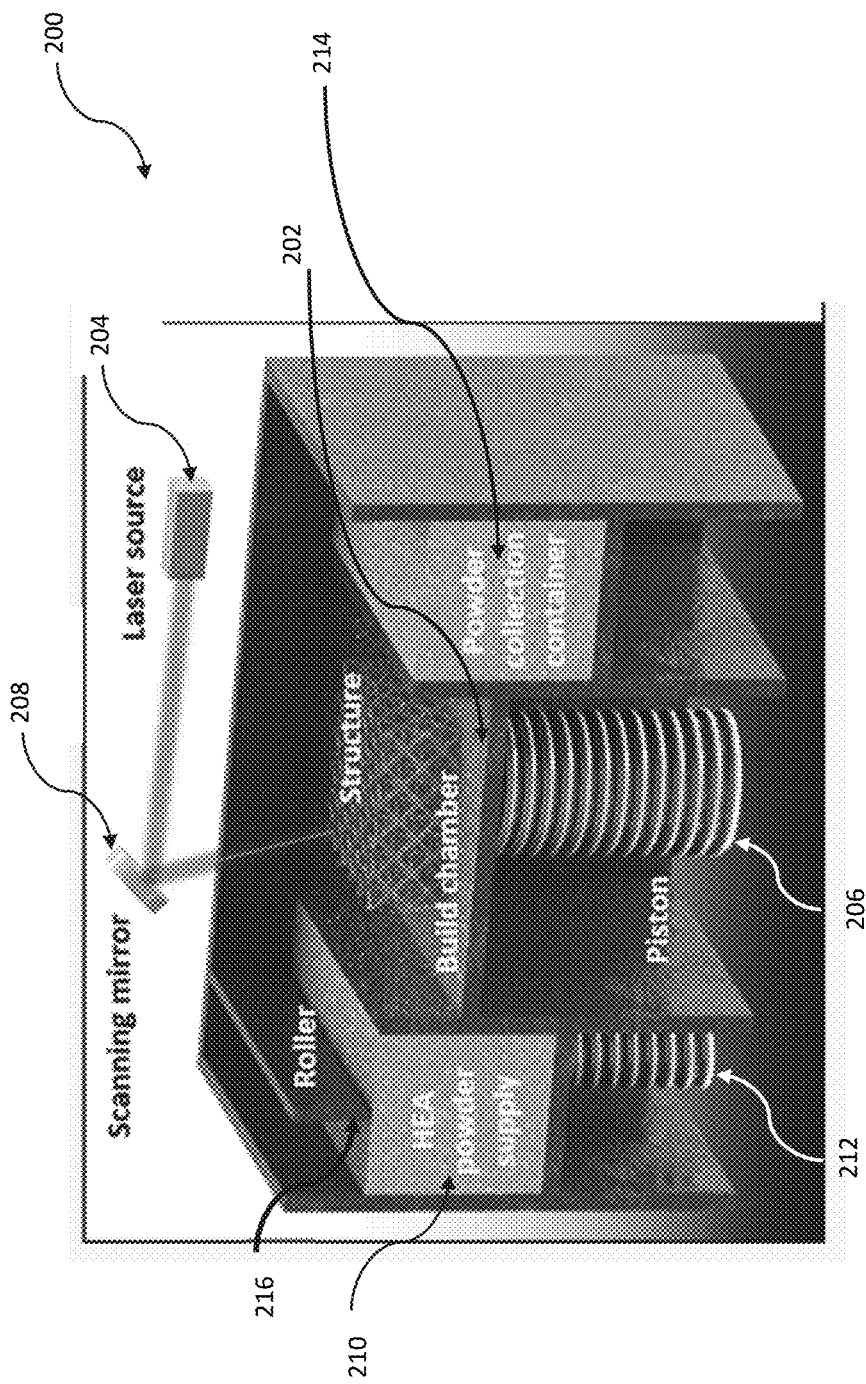
FIG. 2 is a schematic view of an apparatus according to an embodiment of present invention.

In an embodiment, an example of an apparatus 200 for carrying out the method in relation to SLM, EBM and DMLS technologies is shown in FIG. 2. The figure is merely provided as an example to assist the reader in understanding the workings of the invention. As such, the broader inventive concept is not limited by the arrangement shown, as many different arrangements would be within the purview of the skilled addressee.

In an embodiment, the build platform 202 is movable relative to a fixed energy source 204. The platform 202 may be moved by means of a first piston, helical lift or another actuator. For the arrangement shown, a first piston 206 is configured to move the movable build platform 202 in a vertical motion relative to the energy source 204. The energy source 204 may be a laser or electron beam gun. The energy source 204 is located in a position that enables the energy from the energy source 204 to be directed to any point or position on the build platform 202. The energy is directed by an articulated reflector 208, which may include one or more mirrors, lenses or other light directing and focusing devices. The articulated reflector 208 enables the direction of the light to any point on the on the platform.

The layers of HEA powder are arranged on the platform 202 in the following steps. Firstly, the HEA powder is placed into a supply container 210, which is immediately adjacent to the movable build platform 202. The supply container 210 may also be movable by means of a second piston, helical lift or another actuator to enable ease of access to the HEA powder within the container. For the arrangement shown, a second piston 212 is configured to move the supply container 210 in a vertical motion relative to the energy source 204. On the other side of the moveable build platform 202 is a collection container 214. A roller 216 is arranged to be capable of moving along the top of the containers 210 and 214, and the platform 202. The roller 216 is positioned to be in contact with the HEA powder in the supply container 210, and whilst moving to the movable build platform 202, the roller 216 distributes an even layer of the HEA powder on the build platform 202. Any excess HEA powder left over from spreading the first layer on the build platform 202 is carried with the roller 216 and disposed in the collection container 214. A chamber or container (not shown in the Figures) may be formed around the apparatus 200 to prevent environmental contamination during the fabrication process. In embodiments using SLM and DMLS technology, the chamber may be filled with an inert gas, such as argon, to prevent oxidation. Alternatively, in an embodiment using EBM technology the container may enable the formation of a vacuum.

Figure 3:
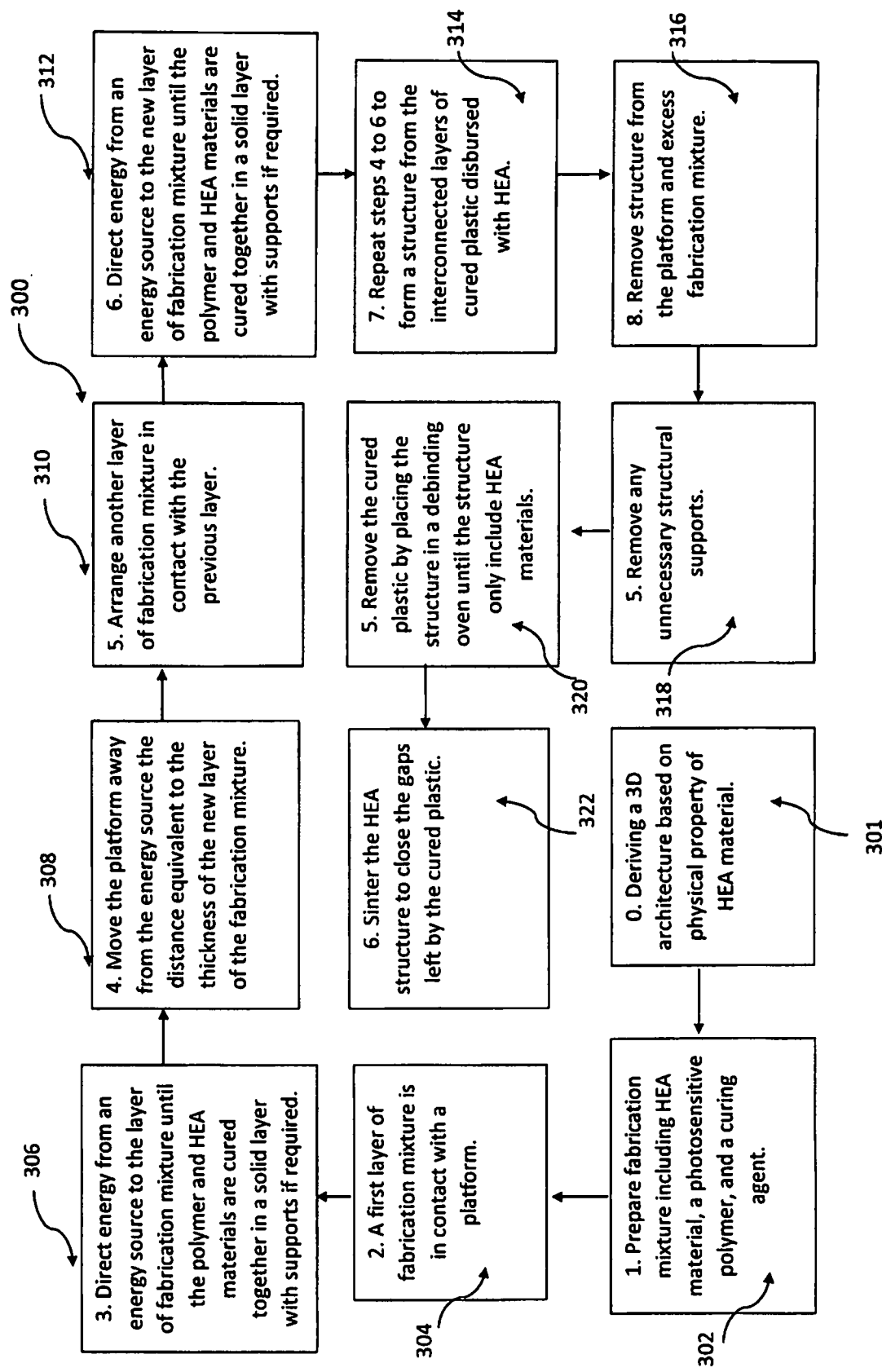
FIG. 3 shows a process diagram of an embodiment of present invention.

Referring to FIG. 3, an embodiment is provided that uses Stereolithography (SLA) or two-photon lithography (TPL). Both technologies rely on the application of an energy source to trigger photopolymerisation of the fabrication mixture into a polymer compound in a plurality of layers which forms a structure.

In an embodiment, the first steps includes deriving of a 3D architecture based on the physical property of a high entropy alloy 301, followed by the preparation of a HEA mixture 302 including HEA metallic powder, a photopolymer resin and a curing agent or photoinitiator compound, such as photopolymer resin poly-(ethylene glycol) diacrylate (PEGDA) and photoinitiator bis(2,4,6-trimethylbenzoyl)-phenylphosphineoxide photoinitiator. Other photopolymer resins, curing agents or photoinitiator compounds may be used within the purview of the skilled addressee. An alternative example of a photopolymer Trimethylolpropane triacrylate (TMPTA) and photoinitiator 2-benzyl-2-(dimethylamino)-40-morpholinobutyrophenone (DBMP). The resulting HEA mixture is a liquid, semi-liquid or slurry-like mixture.

To create a structure from a plurality of layers, a first layer of the HEA mixture is arranged on a platform 304 which is movable relative to an energy source. The energy from the energy source is applied to one or more portions of the HEA mixture 306. In SLA technologies, the energy source is a UV light source, wherein the photoinitiator reacts with the UV light to cure portions or sections the slurry-like HEA mixture into layers of a solid polymer including the HEA material. In TPL technologies, the energy source may include a fibre laser to react with the photoinitiator and cure the HEA mixture.

In an embodiment, structural supports may also be added to the HEA structure in order to provide support during fabrication in cases where the initial or base layers of the structure do not provide sufficient support to top layers. These supports are typically removed during post fabrication processing. Further, stress relieving processes or heat-treating processes may also be performed on the structure during post fabrication and prior to removal from support structures. In an embodiment, the platform may be heated or cooled to improve the adhesion of the structure to the platform.

Once the first layer has cured, the platform moves away from the energy source 308 and a second layer of HEA mixture 310 is arranged contiguous to the first layer 304. The distance that the moveable platform moves away from the energy is equivalent to the thickness of the second layer of HEA mixture applied, such that the distance between the energy source and the top layer of powder remains the same regardless how many layers of HEA mixture are applied.

The steps of directing energy from the energy source 306, moving the movable platform 308 and applying another layer of HEA mixture 310 are repeated 312 until the structure is completed 314. The resulting structure is formed from both plastic and HEA material. The completed structure is then removed from the build platform 316. Any excess HEA mixture coating the structure is cleaned of the structure. In an embodiment, any structural supports provided to support the structure during fabrication are removed prior to post fabrication processing 318.

In an embodiment, the photopolymer is removed from the completed structure by subjecting the structure to a debinding process 320. This may include chemical or mechanical processing. An example of a debinding process is heating the structure in a debinding oven. The oven heats the structure until the photopolymer is removed from the structure by melting or evaporating the photopolymer out of the structure. Any other non-HEA additives would also be removed during this process. The debinding process results in the structure being entirely comprised of HEA material.

The removal of the photopolymer from the structure may result in the HEA structure including gaps, pores, or voids that the photopolymer previously filled. In one embodiment, the HEA structure is compressed to remove the gaps, pores, or voids, by means of sintering the HEA structure 322 which involves the process of compressing the structure by applying heat or pressure without the structure liquefying. Sintering improves the density of the structure, but also causes a volumetric reduction in the overall printed structure. The volumetric reduction experienced by the HEA structure may be in the range of 10% to 30% of the original volume of the structure.

In an embodiment, two apparatuses 400 for carrying out the method in relation to SLA and TPL technologies is shown in FIGS. 4a and 4b. The figures are merely provided as an example to assist the reader in understanding the workings of the invention. As such, the broader inventive concept is not limited by the arrangement shown, as many different arrangements would be within the purview of the skilled addressee.

Referring to FIG. 4a, an embodiment is provided including a build platform 402, which is movable relative to a fixed energy source 404. The platform 402 may be moved by means of a piston, helical lift or another actuator. For the arrangement shown, a helical lift 406 is configured to move the movable build platform 402 in a vertical motion relative to the energy source 404. The energy source 404 may be a UV light source or a fibre laser. The energy source 404 is located in a position that enables the energy from the energy source 404 to be directed to any point or position on the build platform 402. The energy is directed by an articulated reflector 408, which may include one or more mirrors, lenses or other light directing and focusing devices. The HEA mixture is contained within a container 410.

In the embodiment shown in FIG. 4a, the energy source 404 and articulated reflector 408 are positioned underneath the base of the container 410, wherein the base of the container 410 may be fully or semitransparent in order to allow the light energy to pass to the HEA mixture through the base of the container. The build platform 402 is initially extended and arranged to contact the HEA mixture in the container 410. The platform 402 is gradually retracted away from the container 410 by means of the helical lift 406. This may be referred to as an upside-down configuration.

In the embodiment shown in FIG. 4b, the energy source 414 and articulated reflector 418 are positioned above the of the container 420. The build platform 412 is located within the container 420 and initially extended and arranged to contact the top portion of the HEA mixture in the container 420. As layers are added to the structure, the platform 412 is gradually retracted deeper inside the container and away from the energy source by means of the piston 416. This may be referred to as a right-side up configuration.

The layers of HEA mixture are arranged on the platform 402, 412 in the following steps. Firstly, the HEA mixture is placed into a container 410, 420. The container may include a smoothing roller (not shown) to sweep across the surface of the HEA mixture to ensure that the surface of the fabrication is smooth and level. In an embodiment, the container is automatically filled with HEA mixture by an automatic meter and sensor. Alternatively, the container may be filled manually.

The first layer of the structure is formed by curing the first layer whilst the platform is in contact with the surface of the HEA mixture. Accordingly, each new layer is formed by curing a portion of the surface of the HEA mixture in contact with the preceding layer of the structure. With each layer, the build platform moves away from the energy source. A chamber (not shown in the Figures) may be formed around the apparatuses 400 to prevent environmental contamination during the fabrication process.

Figure 5:
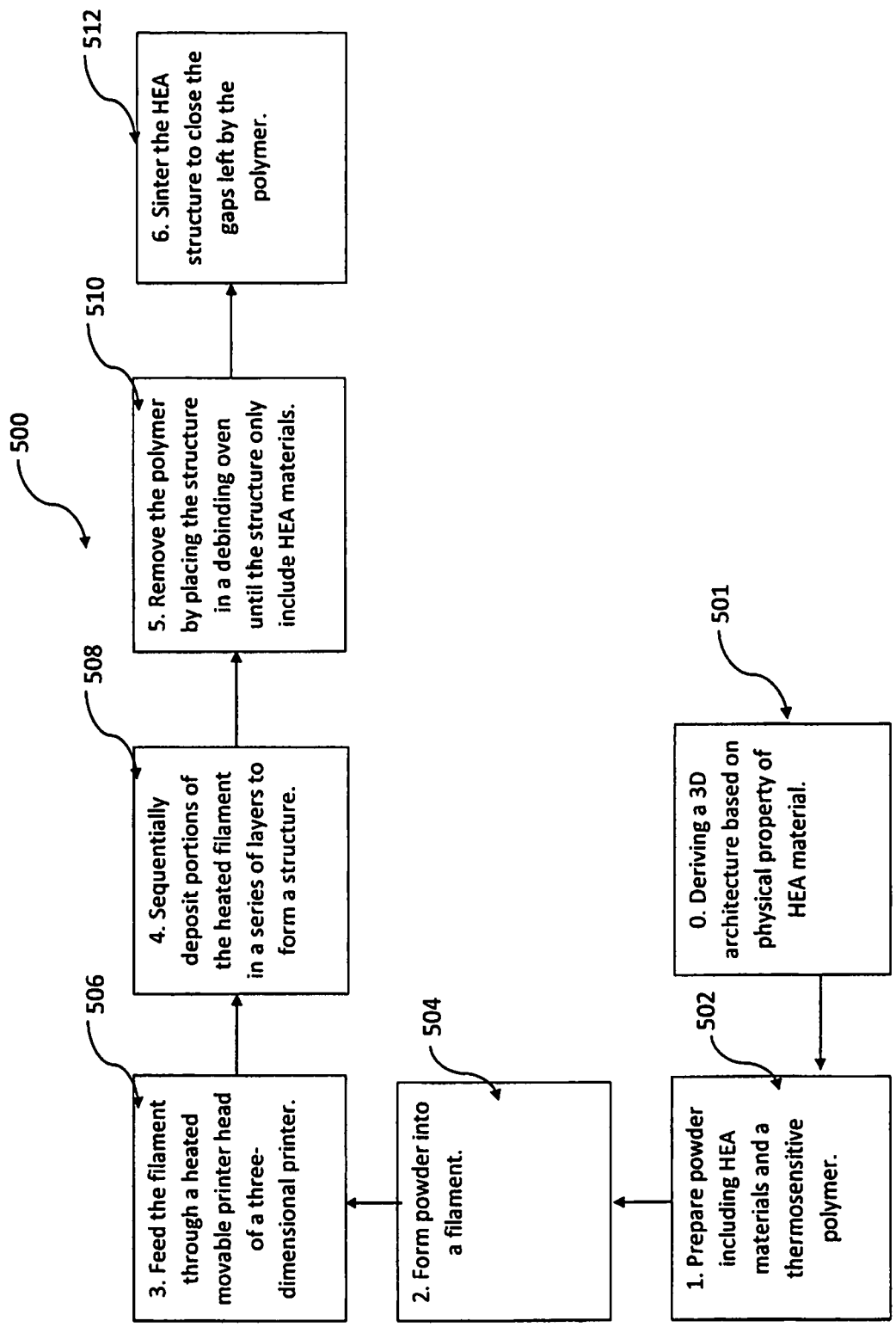
FIG. 5 shows a process diagram of an embodiment of present invention.

Referring to FIG. 5, an embodiment is provided which includes the use of fused filament fabrication (FFF) technology, also referred to as fused deposition modelling (FDM). FFF technology relies on the sequential deposition of portions of a melted material in a series of layers to form a structure. As would be understood by the skilled addressee, other similar technologies, such as Rapid Liquid Printing (RLP), Aerosol Jet, and FluidFM may also be used to fabricate HEA structures.

In an embodiment first includes deriving of a 3D architecture based on the physical property of a high entropy alloy 501, followed by the preparation of a HEA mixture 502 including HEA metallic powder and a thermosensitive polymer, wherein the HEA mixture is formed into a HEA filament or wire 504.

The HEA filament is fed through a thermal printing head 506 that is moveable relative to a fabrication base. As the filament is passed through the thermal printing head, the thermal printing head heats the filament so that the filament is melted and becomes soft and malleable. The melted filament is deposited in a first layer on the fabrication base by an extrusion nozzle provided to the thermal printing head. The first layer is allowed to cool in order to enable the melted filament to solidify into one or more solid portions.

In an embodiment, structural supports may also be added to the HEA structure in order to provide support during fabrication in cases where the initial or base layers of the structure do not provide sufficient support to top layers. These supports are typically removed during post fabrication processing. Further, stress relieving processes or heat-treating processes may also be performed on the structure during post fabrication and prior to removal from support structures.

Once each layer has solidified, another layer is applied in the same manner until the structure is completed 508. The resulting structure is formed from both plastic and HEA material. The completed structure is then removed from the build platform. Any excess HEA mixture coating the structure or is a result of deposition errors is removed. In an embodiment, any structural supports provided to support the structure during fabrication are removed prior to post fabrication processing.

In an embodiment, the photopolymer is removed from the completed structure by subjecting the structure to a debinding process 510. This may include chemical or mechanical processing. An example of a debinding process is heating the structure in a debinding oven. The oven heats the structure until the photopolymer is removed from the structure by melting or evaporating the photopolymer out of the structure. Any other non-HEA additives would also be removed during this process. The debinding process results in the structure being entirely comprised of a HEA material.

The removal of the photopolymer from the structure may result in the HEA structure including gaps, pores, or voids that the photopolymer previously filled. In one embodiment, the HEA structure is compressed to remove the gaps, pores, or voids, by means of sintering the HEA structure 512 which involves the process of compressing the structure by applying heat or pressure without the structure liquefying. Sintering improves the density of the structure, but also causes a volumetric reduction in the overall printed structure. The volumetric reduction experienced by the HEA structure may be in the range of 10% to 30% of the original volume of the structure.

Figure 6:
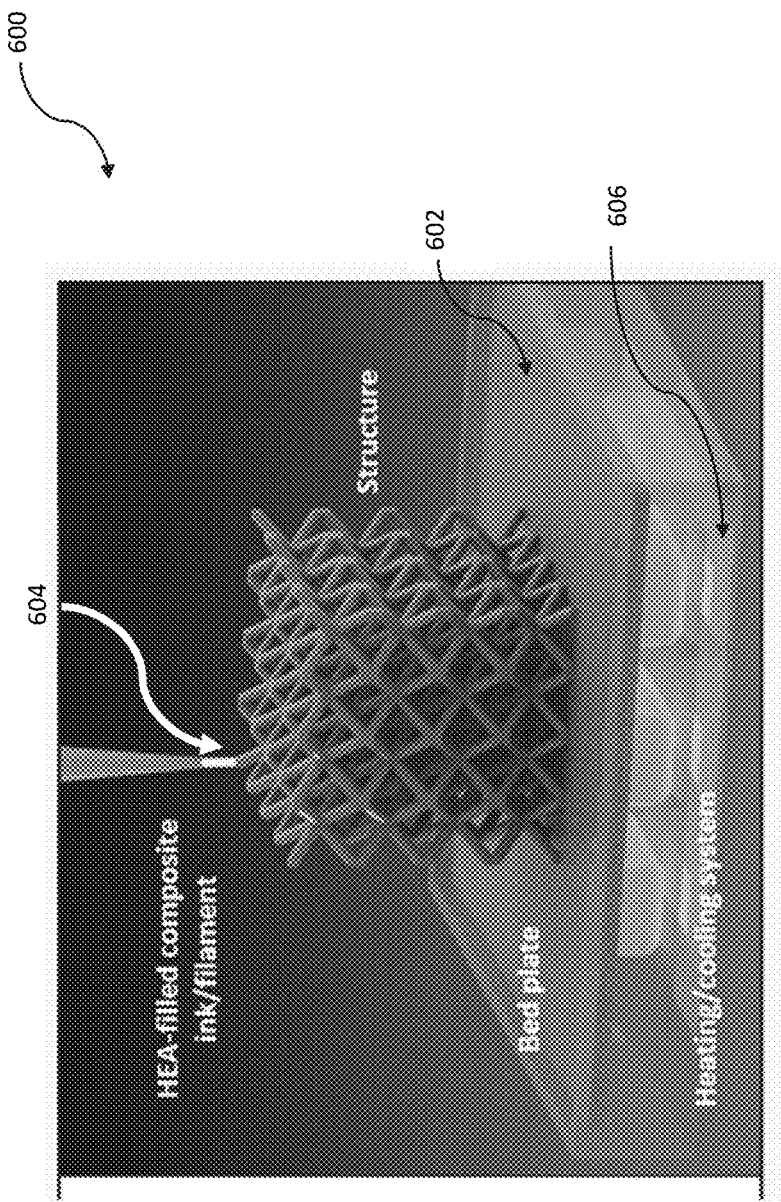
FIG. 6 shows a schematic view of an apparatus according to an embodiment of present invention.

In an embodiment, an apparatus 600 for carrying out the method in relation to FFF technology is shown in FIG. 6. The figures are merely provided as an example to assist the reader in understanding the workings of the invention. As such, the broader inventive concept is not limited by the arrangement shown, as many different arrangements would be within the purview of the skilled addressee.

Referring to FIG. 6, an embodiment is provided including a build platform. A movable printer head 604 moves relatively to the build platform 602. The thermal printing head is configured to be moveable in horizontal and/or vertical directions. In one embodiment, the thermal printing head is movable along a wheel and track arrangement driven by a server motor and controller arrangement (not shown in the Figures). In an embodiment, the platform may include a temperature variation system 606 which varies the temperature of the platform to improve the adhesion of the structure to the platform.

Figure 7:
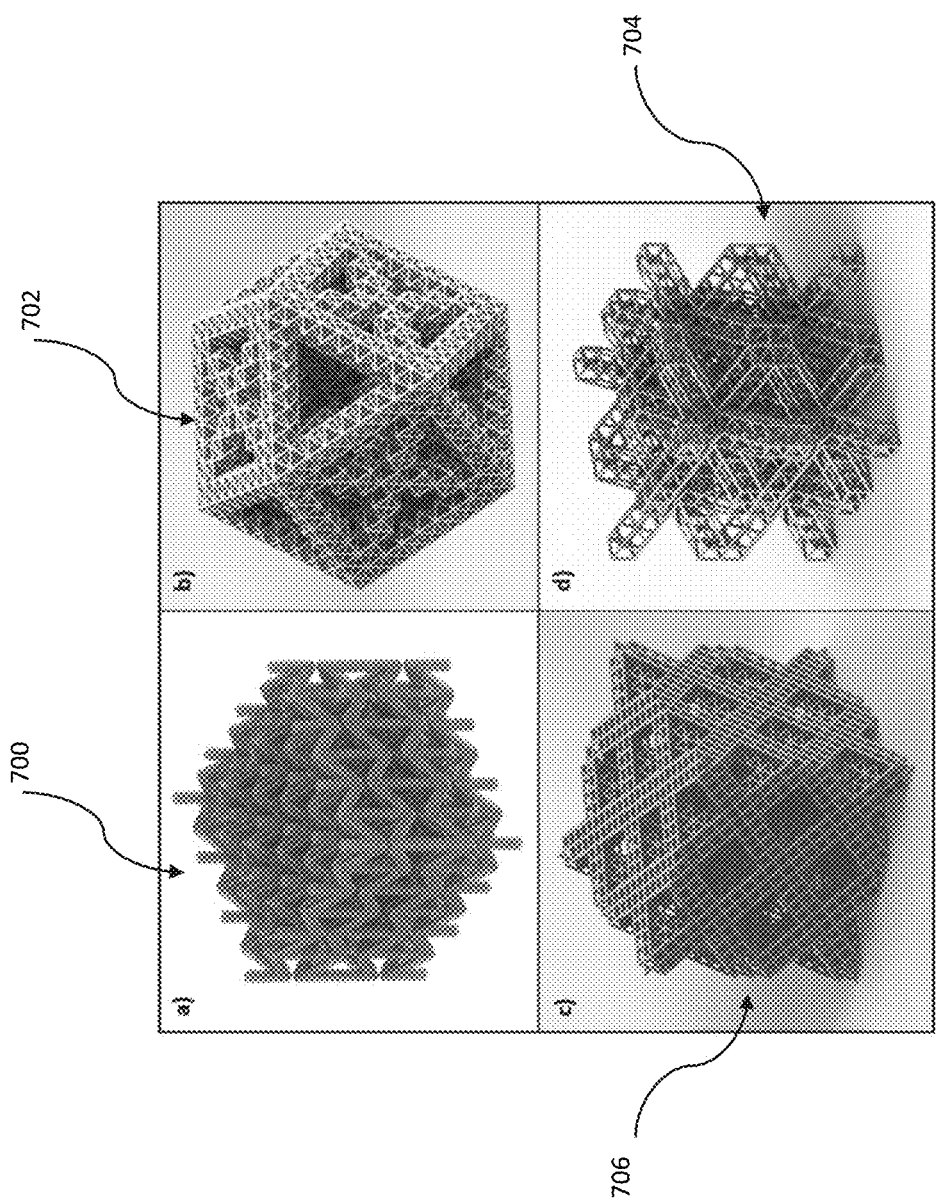
FIG. 7 shows example structures fabricated in accordance with embodiments of present invention.

Referring to FIG. 7, structures 700, 702, 704 and 706 provide examples of the structures that may be fabricated from HEA using the broad inventive concept and the embodiments described and defined therein. Structures 700, 702, 704 and 706 are complex structures, which would be very difficult, if not impossible for conventional HEA manufacturing techniques to fabricate.

Figure 8:
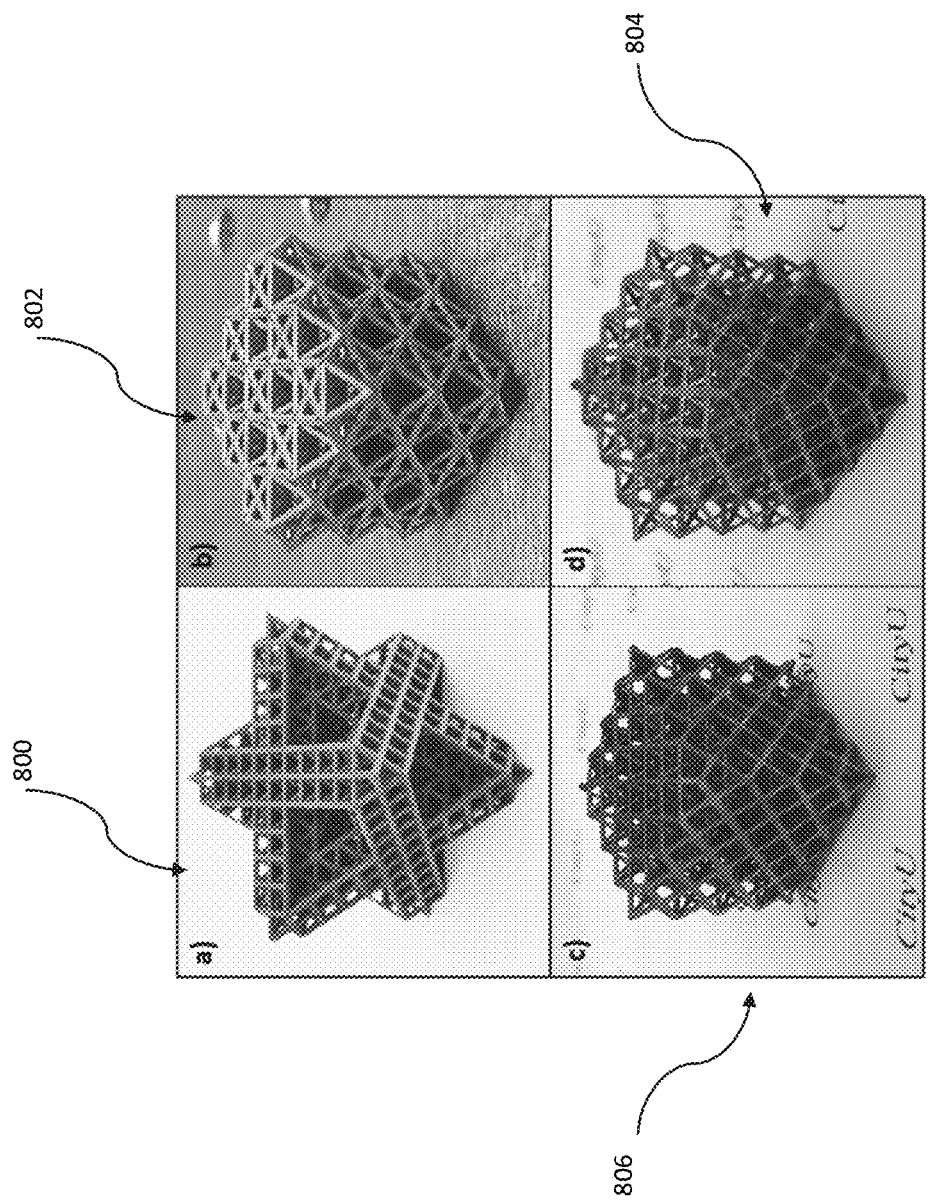
FIG. 8 shows example structures fabricated in accordance with embodiments of present invention.

Referring to FIG. 8, structures 800, 802, 804 and 806 provide examples of the structures that may be fabricated from HEA using the broad inventive concept and the embodiments described and defined therein. Structures 800, 802, 804 and 806 are complex structures, which would be very difficult, if not impossible for conventional HEA manufacturing techniques to fabricate.

The material properties of the fabricated HEA structures may be tested by a number of different testing methods. The testing methods may include compression, tensile, bending, etc. with parameters in accordance with standard testing procedures, such as the American Society for Testing Materials (ASTM) standard. Furthermore, the morphology and microstructural features of the structures may be analysed by electron microscopy techniques, such as Scanning Electron Microscopy (SEM) and Transmission Electron Microscopy (TEM). The chemical composition and phase structure of the fabricated HEA structure or HEA powder or may be analysed through Energy Dispersive X-Ray Spectroscopy (EDX), X-Ray Diffraction (XRD), and Atomic Probe Tomography (APT). The thermal stability, specific heat capacity, and thermal expansion could be measured via Differential Thermal Analysis (DTA) and Thermomechanical Analysis (TMA). The use of such testing methods may enable a more synergistic design approach by modifying the architecture of the structure to complement or enhance the material properties inherent within the HEA material.

In an embodiment, the architected structures described by the broad inventive concept or embodiments may be simulated and designed by using a Computer Aided Design (CAD) software, such as but not limited to SolidWorks, CATIA, etc. The structures may be tested and optimised by the performance of Finite Element Analysis (FEA), allowing for the novel coupling between architecture and composition in the manufacture of HEAs.

In an embodiment, the application of energy to the fabrication powder or mixture, or the deposition of the fabrication filament as a plurality of layers is carried by a HEA structure fabricating apparatus, such as but not limited to a SML, SLA or FFF apparatus. The HEA structure fabricating apparatus is controlled by a computing device which carries out a series of instructions translated from a CAD file containing a digital representation of the HEA structure. The file may be in a number of file formats including, STEP and Standard Tessellation Language file.

Throughout this specification, unless the context requires otherwise, the word "comprise" or variations such as "comprises" or "comprising", will be understood to imply the inclusion of a stated integer or group of integers but not the exclusion of any other integer or group of integers.

Those skilled in the art will appreciate that the invention described herein is susceptible to variations and modifications other than those specifically described. The invention includes all such variation and modifications. The invention also includes all of the steps, features, and formulations referred to or indicated to in the specification, individually or collectively and any and all combinations or any two or more of the steps or features.

Other definitions for selected terms used herein may be found within the detailed description of the invention and apply throughout. Unless otherwise defined, all other scientific and technical terms used herein have the same meaning as commonly understood to one of ordinary skill in the art to which the invention belongs.

HEAs possess a number of advantages over traditional alloys due to the use of multiple principal components instead of basing them on only one or two core elements. This has allowed HEAs to exhibit unique properties, some of which unattainable through conventional means, such as an increase in fracture resistance and ductility at cryogenic temperatures. However, complex metallurgical processes and the need for traditional tooling to produce functional parts are often difficult, costly and time consuming. Therefore, the broad inventive concept and embodiments described and defined reduces the time, cost and completely compared to traditional methods.

By introducing architecture into the synthesis of HEAs, it is possible to produce parts with structural hierarchies or functional gradient, exhibiting unprecedented and desirable properties in a shorter period of time with the aid of topological optimization. This approach of producing architected HEAs will expand the range of properties achievable by HEAs, broadening its practical applications. Furthermore, the use of additive manufacturing reduces the overall cost of raw materials required for testing different HEAs while being able to produce homogenous parts that fully utilize the numerous advantages of HEAs.

The broad inventive concept and embodiments described and defined significantly reduce the time it takes for the employment of new materials with novel properties through the synergistic effect between the novel alloy design concept of HEAs and structural configuration. The reduction in fabrication time provided by the present invention has particular advantages for the design and development of high-strength and lightweight materials in the aerospace and construction industries.

Architected HEAs manufactured through additive manufacturing would accelerate the incorporation of such structures within industry due to its high flexibility to produce parts with desirable properties in a quick and cost-efficient manner. Furthermore, the fabrication of architected 3D HEA structures as described above enables fabrication without the need for traditional tooling or being subjected to the limitations imposed by restricted geometries. For example, the broad inventive concept and embodiments could be applied in the field of aerospace to not only replace certain parts (e.g. turbine blades, guide vanes, etc.) in an airplane, but also enhance its performance through topological and compositional optimization. The present invention may also find applications in the biomedical field, where highly customized parts are required to suit the needs of each patient (e.g. hip implants).

The invention claimed is:

1. A method for the fabrication of architected 3D high entropy alloy structures comprising the steps of: deriving a 3D architecture based on at least one physical property of a high entropy alloy;
   preparing a fabrication mixture that includes a mixture of two or more metallic powders of nearly equal quantities, a photosensitive polymer, and a curing agent;
   arranging a first layer of the fabrication mixture on a platform proximate to an energy source;
   directing energy provided by the energy source to one or more portions of the fabrication mixture to activate the curing agent to form one or more solid portions;
   translating the platform relative to the energy source such that the platform is proximate to the energy source and arranging a second layer of the fabrication mixture contiguous to the first layer of fabrication mixture on the platform; whereby the steps of arranging a layer of fabrication mixture, directing energy to the one or more portions of the fabrication mixture, and translating the platform are repeated such that the resulting layers of one or more solid portions are arranged in such a way as to form a structure and removing the photosensitive polymer from the structure by means of a debinding process so that the structure is entirely comprised of a mixture of metals and includes the derived 3D architecture.

2. A method for the fabrication of architected 3D high entropy alloy structures in accordance with claim 1, wherein the method further comprise the step of compressing the structure entirely comprised of a mixture of metals by the application of at least one of heat and pressure up to the point of liquidation.

3. A method for the fabrication of architected 3D high entropy alloy structures in accordance with claim 1, wherein the energy source include an ultra violet light source, or a fibre laser.

4. A method for the fabrication of architected 3D high entropy alloy structures in accordance with claim 1, wherein the platform is moveable relative to the energy source.

5. A method for the fabrication of architected 3D high entropy alloy structures in accordance with claim 4, wherein the platform is arranged to be movable within a fixed container containing the fabrication mixture.

6. A method for the fabrication of architected 3D high entropy alloy structures in accordance with claim 4, wherein the platform is arranged to be movable outside a fixed container containing the fabrication mixture.

7. A method for the fabrication of architected 3D high entropy alloy structures in accordance with claim 1, wherein the method further includes varying the temperature of a portion of the platform to improve the adhesion of the first layer of the fabrication mixture to the platform.

8. A method for the fabrication of architected 3D high entropy alloy structures in accordance with claim 1, wherein the method further includes the formation of structural supports to support the fabrication of the architected 3D structure.

9. A method for the fabrication of architected 3D high entropy alloy structures in accordance with claim 1, wherein the method further includes subjecting the structure to at least one of a stress relieving processes and a heat treatment.

10. A method for the fabrication of architected 3D high entropy alloy structures in accordance with claim 1, wherein the energy is directed at the fabrication mixture is associated with a series of instructions translated from a computer assisted drawings file.

11. A method for the fabrication of architected 3D high entropy alloy structures comprising the steps of:
deriving a 3D architecture based on at least one physical property of a high entropy alloy;
preparing a fabrication filament that includes a mixture of two or more powdered metals of nearly equal quantities and a thermosoftening polymer; feeding the fabrication filament through a thermal printing head moveable relative to a fabrication base;
sequentially depositing one or more layers of heated fabrication filament by means of the thermal printing head to form a layered structure; and,
removing the thermosoftening polymer from the structure by means of a debinding process so that the structure is entirely comprised of a mixture of metals and includes the derived 3D architecture.

12. A method for the fabrication of architected 3D high entropy alloy structures in accordance with claim 11, wherein the method further comprises the step of compressing the structure entirely comprised of a mixture of metals by the application of at least one of heat and pressure up to the point of liquidation.

13. A method for the fabrication of architected 3D high entropy alloy structures in accordance with claim 11, wherein the method further includes the formation of structural supports to support the fabrication of the architected 3D structure.

14. A method for the fabrication of architected 3D high entropy alloy structures in accordance with claim 11, wherein the method further includes the step of subjecting the structure to at least one of a stress relieving processes and a heat treatment.

15. A method for the fabrication of architected 3D high entropy alloy structures in accordance with claim 11, wherein the deposition of the fabrication filament in the one or more layers is in accordance with a series of instructions translated from a computer assisted drawing file.

* * * * *